United States Patent
Opalko

(10) Patent No.: US 6,469,083 B1
(45) Date of Patent: Oct. 22, 2002

(54) NO DRY MASTER BATCH FOR POLYESTER RESINS

(75) Inventor: Robert J. Opalko, Middleburg Heights, OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/873,488

(22) Filed: Jun. 4, 2001

(51) Int. Cl.$^7$ .............................. C08K 5/09; C08K 5/10; C08K 5/12
(52) U.S. Cl. ........................................ 524/291; 524/413
(58) Field of Search ................................. 524/291, 413

(56) References Cited

U.S. PATENT DOCUMENTS

| | | | |
|---|---|---|---|
| 4,230,501 A | * 10/1980 | Howard et al. | 106/308 Q |
| 4,484,952 A | * 11/1984 | Bes et al. | 106/308 Q |
| 4,988,477 A | * 1/1991 | Bes et al. | 264/537 |
| 5,686,515 A | * 11/1997 | Phillips et al. | 524/275 |
| 6,130,290 A | * 10/2000 | Troy et al. | 525/63 |

FOREIGN PATENT DOCUMENTS

GB          1490320     * 11/1977

* cited by examiner

Primary Examiner—Kriellion A. Sanders
(74) Attorney, Agent, or Firm—Rankin, Hill, Porter & Clark LLP

(57) ABSTRACT

The present invention provides a master batch for polyester resins that does not need to be dried prior to use. The master batch according to the invention includes an additive package dispersed in a carrier. The additive package includes one or more colorants, light stabilizers, heat stabilizers, flame retardants, antioxidants, lubricants, anti-stats, biocides, fillers, and process aids. The carrier includes from about 10 to about 25 percent by weight of one or more polyhydric alcohol esters of wood and/or gum rosin, from about 5 to about 35 percent by weight of one or more core-shell polymers, and from about 25 to about 70 percent by weight of one or more thermoplastic polyesters compatible with the bulk polyester molding resins.

The present invention also provides a method of forming a polyester article. The method includes letting down a master batch according to the invention into a polyester resin, heating the master batch and the polyester resin to form a melt, and processing the melt to form the polyester article. The method can be used to form a variety of polyester articles such as, for example, blow molded bottles, extrusion blow molded bottles, injection molded bottles, extruded film sheets, and drawn fibers.

20 Claims, No Drawings

NO DRY MASTER BATCH FOR POLYESTER RESINS

FIELD OF INVENTION

The present invention provides a master batch for use with polyester resins that does not need to be dried prior to use.

BACKGROUND OF THE INVENTION

Master batch systems, which are sometimes referred to as concentrates or additive packages, can be letdown at controlled ratios to deliver predetermined amounts of colorants, light stabilizers, heat stabilizers, flame retardants, antioxidants, lubricants, anti-stats, biocides, fillers, and/or other process aids into host polymer resins. A number of master batch systems are known. One type, which is sometimes referred to as a liquid color system or a liquid color concentrate, consist of various colorants and/or other additives dispersed in a hydrophobic liquid carrier that is typically mixed with host polymer resin during thermal processing (e.g., molding or extrusion) to impart color and/or other desirable properties to the polymeric article being formed.

Liquid color concentrates, while effective with many host polymer resins, do present some limitations and/or disadvantages when used with polyester resins such as, for example, polyethylene terephthalate (hereinafter "PET"), polybutylene terephthalate (hereinafter "PBT"), and polyethylene naphthalate (hereinafter "PEN"). For example, it is known that liquid color concentrates containing high colorant loadings can sometimes adversely affect physical properties of the host polyester resin including degrading the molecular weight of the polymer. Molecular weight is typically monitored by measuring the solution intrinsic viscosity (hereinafter "SIV") of the polymer. Additionally, the liquid carriers in liquid color concentrates can sometimes act as lubricants and thereby promote screw slippage during thermal processing, which adversely affects production speed and efficiency.

Another type of master batch system commonly used to deliver additives to polymer resins is sometimes referred to as a wax-based master batch system. One example of a wax-based system is described in Bes et al., U.S. Pat. No. 4,988,477. In wax-based systems, colorants and/or other additives are dispersed in a wax-like carrier that is generally a solid at ambient temperatures. The wax-like carrier melts at a temperature well below the melt temperature of the host polymer resin into which the master batch is being added. Typically, wax-based systems are added to polymer resins as solid granules or beads using special cooled feeders that prevent the wax-based carrier from melting prematurely.

Wax-based systems, while effective for delivering colorants and/or other additives to some polymer resins, also present some limitations and disadvantages when used with polyester resins. For example, it is very difficult, if not impossible, to obtain a high loading of various additives in wax-based systems (e.g., it is usually not possible to obtain additive loadings higher than 50% by weight). This necessitates the use of relatively larger volumes of the wax-based master batch systems, which can result in a degradation of the physical properties of the host polymer resin. Furthermore, the melted waxes tend to act as lubricants and thus contribute to significant screw slippage during thermal processing.

Another form of master batch system commonly used to deliver additives to polymer resins is sometimes referred to as an olefin-based system. In olefin-based systems, colorants and/or other additives are dispersed in olefin polymers such as, for example, polymers and copolymers of ethylene. One example of an olefin-based system is disclosed in Phillips et al., U.S. Pat. No. 5,686,515. Again, while olefin-based systems can be used successfully with many polymer resins, such systems do have some limitations and/or disadvantages when used with polyester resins. For example, because olefin-based systems are not wholly compatible with polyester resins, they tend to "plate out" or form deposits on molds and/or other thermal processing equipment over time.

Attempts have been made in the past to form master batch systems using polyester resin carriers to deliver the additives to host polyester resins. Unfortunately, these attempts have met with very little success. One problem with such systems is that polyester resins, which are hygroscopic, must generally be dried before they are melt processed in order to inhibit the degradation of molecular weight of the polymer. Accordingly, such prior polyester resin based master batch systems required the installation and use of costly driers.

A master batch is needed for use in polyester resins that facilitates a high loading of colorants and/or other additives. Such a master batch should be compatible with the polyester resins in which it is used, and should not "plate out" on processing equipment. Moreover, it should not require drying prior to use. In addition, such a master batch should preferably not cause any screw slippage or adversely affect the physical properties of the polyester resin such as, for example, molecular weight as measured by SIV. Moreover, such a master batch should not require the use of special equipment or processing conditions in order to be used with conventional polyester resin thermal processing equipment and should be acceptable for use in food contact applications. Ideally, the master batch should not adversely affect the clarity of the host polyester resin where the maintenance of clarity is important.

SUMMARY OF INVENTION

The present invention provides a master batch for use with polyester resins. The master batch according to the present invention comprises an additive package dispersed in a carrier. The additive package comprises one or a combination of additives such as, for example, colorants, light stabilizers, heat stabilizers, flame retardants, antioxidants, lubricants, anti-stats, biocides, fillers, and/or other process aids. The carrier comprises an intimate mixture of from about 10 to about 25 percent by weight of one or more polyhydric alcohol esters of wood and/or gum rosin, from about 5 to about 35 percent by weight of one or more core-shell polymers, and from about 25 to about 70 percent by weight of one or more thermoplastic polyesters compatible with the polyester resin. Preferably, the additive package comprises at least about 5 percent by weight, and more preferably at least about 50 percent by weight, of the master batch.

The master batch according to the invention is compatible with polyester resins such as PET, PBT, PEN, and copolyesters of PET and PEN. It does not need to be dried prior to use. It does not cause any screw slippage, nor does it adversely affect the molecular weight of the host polyester resin. When necessary, the master batch according to the present invention can be formed so as to maintain the clarity of the host polyester resin. It is acceptable for use in food contact applications. Furthermore, the master batch according to the invention does not "plate out" on processing equipment.

The present invention also provides a method of forming a polyester article. The method comprises letting down a master batch according to the invention into a polyester resin, heating the master batch and the polyester resin to form a melt, and processing the melt to form the polyester article. The method can be used to form a variety of polyester articles such as, for example, blow molded bottles, extrusion blow molded bottles, injection molded bottles, extruded film sheets, and drawn fibers. It will be appreciated that the method can also be used to form preforms (parisons).

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The present invention provides a master batch for polyester resins such as, for example, PET, PBT, PEN, and copolyesters of PET and PEN. The polyester resins in which the master batch is used can be virgin polyester resins, recycle stream polyester resins, or mixtures of the same. The polyester resins can be uncolored or pre-colored. Preferably, the polyester resins are in the form of solid pellets, granules, or flakes that can be fed into conventional thermal processing equipment.

The master batch according to the present invention serves the same purpose as master batch systems known in the art. In other words, the master batch according to the present invention can be used to deliver additives such as, for example, colorants, light stabilizers, heat stabilizers, flame retardants, antioxidants, lubricants, anti-stats, biocides, fillers, and process aids, to polyester resins that are being thermally processed into articles by injection molding, blow molding, extrusion blow molding, film sheet extruding, or fiber drawing.

In most instances, those having skill in the art will prefer to use a master batch that has the highest concentration of all of the various additives to be delivered to polyester resin in order to minimize the amount of carrier material added to the polyester resin. The master batch according to the present invention facilitates a high loading of colorants and/or other additives, preferably greater than about 5 percent by weight. More preferably, the additive package comprises at least about 50 percent by weight of the master batch. Dispersants, which are well known in the art, can be used to boost loading levels of the additive package in the master batch.

It will be appreciated that while it is generally advantageous to obtain the highest additive loading possible in a master batch, actual additive loading in terms of weight percent will vary significantly depending upon the nature of additives being used and the particular application for which the master batch is being used. Loadings in transparent applications will generally be much lower than in opaque applications.

The additive package typically comprises one or more selected from the group consisting of colorants, light stabilizers, heat stabilizers, flame retardants, antioxidants, lubricants, anti-stats, biocides, fillers, and process aids. As used in the instant specification and in the appended claims, the term "colorants" means substances that are mixed with polyester resins during processing to impart color and/or opacity to the processed resin. The term "colorants" is thus intended to refer to all conventional organic pigments, dyes, dyestuffs, and inorganic pigments that are used to color bulk polyester molding resins. The term "colorants" also applies to substances that impart various shades of black (e.g., carbon blacks) and white (e.g., titanium dioxide) to polyester resins.

Examples of organic pigments commonly used to impart color to bulk polyester molding resins include: (a) the azo pigments, such as toluidine red and para reds; (b) triphenylmethane pigments, such as malachite green; (c) xanthene pigments, such as rhodamines; (d) thiazole pigments; (e) quinoline pigments; (e anthraquinone pigments; (g) various phthalocyanines; (h) oxazines; (i) alkali pigments, such as alkali blue; and ) quinacridones. Examples of inorganic pigments commonly used to impart color to bulk polyester molding resins include: (a) the simple oxides of zinc, lead, antimony, iron, chrome, titanium, and other metals; and (b) the Category B complex inorganic color pigments identified in the Classification and Chemical Description of the Complex Inorganic Color Pigments, Third Edition, published by the Dry Color Manufacturer's Association, 1991. It will be appreciated that pigment dispersions, which are known in the art, can be used in the master batch according to the invention.

The additive package can further comprise one or more light stabilizers. Suitable light stabilizers for use in polyester resins include UV absorbers and hindered amine light stabilizers (hereinafter "HALS"), which can be used separately or in combination. Suitable UV absorbers include, for example: 2-(2'-hydroxy-3', 5'-di-tert-amylphenyl) benzotriazole (e.g., Cytec CYASORB UV-2337); 2-(2'-hydroxy-5'-octylphenyl) benzotriazole (e.g., Cytec CYASORB UV-5411); 2-(2'-hydroxy-5'-methylphenyl) benzotriazole (e.g., Cytec CYASORB UV-5365); 2-(2H-benzotriazol-2-yl)-4,6-bis(1-methyl-1-phenylethyl)phenol (e.g., Ciba Geigy TINUVIN 234); and 2-(4,6-diphenyl-1,3,5-triazin-2-yl)-5-hexyloxyphenol (e.g., Ciba Geigy TINUVIN 1577). Suitable HALS include, for example: 1,6-hexanediamine,N,N'-bis(2,2,6,6-tetramethyl)-4-piperindynyl) (e.g., Cytec CYASORB UV-3346); polymers with 2,4-dichloro-6-(4-morpholinyl)-1,3,5-triazine; 1,6-hexanediamine, N,N'-bis(1, 2,2,6,6-pentamethyl-4-piperdinyl) (e.g., Cytec CYASORB UV-3529), and polymers with morpholine-2,4,6-trichloro-1, 3,5-triazine.

The additive package can further comprise one or more antioxidants and/or heat stabilizers. Suitable antioxidants and/or heat stabilizers for use in polyester resins include, for example: hexamethylene bis(3,5-di-tert-butyl-4-hydroxyhydrocinnamate (e.g., Ciba Geigy IRGANOX 259); tetrakis(methylene(3,5-di-tert-butyl4-hydroxyhydrocinnamate)methane (e.g., Ciba Geigy IRGANOX 1010); calcium bis(monoethyl(3,5-di-tert-butyl-4-hydroxybenzyl) phosphonate (e.g., Ciba Geigy IRGANOX 1425); bis (2,4-di-tert-butylphenyl) pentaerythritol disphosphite (e.g., General Electric ULTRANOX 626); trisnonylphenyl phosphite (e.g., General Electric WESTON TNPP); and alpha tocopherol (vitamin E) (e.g., Ciba Geigy IRGANOX E 201).

The additive package can further comprise one or more flame retardants Suitable flame retardants for use in polyester resins include, for example: octabromodiphenyl, decabromodiphenyl, and antimony trioxide.

The additive package can further comprise one or more antistats. Suitable antistats for use in polyester resins include, for example: glycerol monostearate (e.g., American Ingredients PATIONIC 901); glycerol monooleate (e.g., American Ingredient PATIONIC 907); erucamide (e.g., Witco KEMAMIDE E); N,N'-ethylenebisstearamide (e.g., Witco KEMAMIDE W); and sodium alkyl sulfonate (e.g., Chemax CHEMSTAT PS-101).

The additive package can further comprise one or more lubricants. Suitable lubricants for use in polyester resins include, for example: montan waxes, calcium stearate, molybdenum sulfide, silicones, graphite, and polytetrafluoroethylene.

The additive package can further comprise one or more process aids, biocides and/or fillers. Suitable process aids for use in polyester resins include, for example: various esters of pentaerythritol, glycerine, and citric acid. Suitable biocides for use in polyester resins include, for example: 10,10'-oxy-bis-phenoxarsin, N-(-trihalogenomethylthio-)-phthalimide, diphenylstilbine-2-ethylhexanoate, copper-bis-(8-hydroxyquinoline), and tributyltin oxide and its derivatives. Suitable fillers for use in polyester resins include, for example: calcium carbonate, talc, mica, nanoclays, glass spheres, glass fibers, carbon and graphite fibers, aramid fibers, metallic fibers, polyester fibers, polyamide fibers, basalt fibers, organic fillers (nut shells, wood flour, corn cobs, kenaf fibers, etc.), wollastonite, kaolin, flyash, and various nucleating agents, which are well known in the art.

It will be appreciated that virtually any material that is added to polyester resins during thermal processing can be included as part of the additive package. The only limitations is the additive must be stable, and should preferably form a solid at ambient temperatures, or at least be capable of being retained within a solid at ambient temperatures. Most additive packages will contain some amount of one or more colorants, but master batches containing no colorants are also sometimes desired.

The additive package is dispersed in a carrier. The carrier comprises an intimate blend of from about 10 to about 25 percent by weight of one or more polyhydric alcohol esters of wood and/or gum rosin, from about 5 to about 35 percent by weight of one or more core-shell polymers, and from about 25 to about 70 percent by weight of one or more thermoplastic polyesters compatible with the bulk polyester molding resin being colored. The various components of the carrier are separately discussed below.

The presently most preferred polyhydric alcohol esters of wood and/or gum rosin are pentaerythritol esters of partially hydrogenated wood rosin that are solids at room temperature. Suitable solid pentaerythritol esters of partially hydrogenated wood rosin are available commercially from Hercules Chemical Company under the trade designation Floral 105. Other polyhydric alcohol esters of wood and/or gum rosin suitable for use in the invention that are solids at room temperature include, for example, pentaerythritol esters of unhydrogenated wood rosin, pentaerythritol esters of fully hydrogenated wood rosin, glycerol esters of partially hydrogenated wood rosin, glycerol esters of unhydrogenated wood rosin, glycerol esters of fully hydrogenated wood rosin, triethylene glycol esters of partially hydrogenated wood rosin, triethylene glycol esters of unhydrogenated wood rosin, triethylene glycol esters of fully hydrogenated wood rosin, pentaerythritol esters of partially dimerized wood rosin, pentaerythritol esters of fully dimerized wood rosin, glycerol esters of partially dimerized wood rosin, glycerol esters of fully dimerized wood rosin, triethylene glycol esters of partially dimerized wood rosin, triethylene glycol esters of fully dimerized wood rosin, pentaerythritol esters of partially hydrogenated gum rosin, pentaerythritol esters of unhydrogenated gum rosin, pentaerythritol esters of fully hydrogenated gum rosin, glycerol esters of partially hydrogenated gum rosin, glycerol esters of unhydrogenated gum rosin, glycerol esters of fully hydrogenated gum rosin, triethylene glycol esters of partially hydrogenated gum rosin, triethylene glycol esters of unhydrogenated gum rosin, triethylene glycol esters of fully hydrogenated gum rosin, pentaerythritol esters of partially dimerized gum rosin, pentaerythritol esters of fully dimerized gum rosin, glycerol esters of partially dimerized gum rosin, glycerol esters of fully dimerized gum rosin, triethylene glycol esters of partially dimerized gum rosin, and triethylene glycol esters of fully dimerized gum rosin.

It will be appreciated that other solid rosins can successfully be used in the invention in addition to the rosins identified above. However, the following rosins should be avoided: tall oil rosins (contain sulfur and can cause unpleasant odors); maleic anhydride modified rosins (tend to cause unwanted yellowing in the final product); and methyl esters of any type of rosin. Methyl esters of wood and/or gum rosins are generally liquids at room temperature. They can be used if blended with the other components in an extruder, but this presents unnecessary difficulties that can be avoided via the use of a solid rosin. In addition, the use of methyl esters of wood and/or gum rosins tends to lower the melting point of the entire blend, which can cause feeding problems unless the feeder is cooled. For these reasons, $C_2$ or higher polyhydric alcohol esters of wood and/or gum rosin are generally preferred.

The core-shell polymers for use in the invention are well known in the art. Core-shell polymers generally comprise a rubbery core such as a copolymer containing a diolefin (e.g., butadiene) and a shell formed of a hard polymer such as a copolymer of a vinyl aromatic monomer and an acrylate monomer. Core-shell polymers may further comprise one or more intermediate layers or stages.

In opaque applications, the refractive index of the core-shell polymer is not critical, and any of the known core-shell polymers can be used to form the master batch according to the invention. However, in transparent applications where maintenance of the clarity of the host polyester resin is important, it is preferable for the core-shell polymer to have a refractive index within the range of from about 1.55 to about 1.60. Examples of suitable core-shell polymers having a refractive index within the preferred range are described in Troy et al., U.S. Pat. No. 6,130,290, which is hereby incorporated by reference in its entirety for its teachings regarding core-shell polymers. The presently most preferred core-shell polymer for use in transparent applications is available commercially from Rohm & Haas as Paraloid EXL-8619.

The thermoplastic polyesters used in the carrier must be compatible with the polyester resin (i.e., is the same type of polyester). Accordingly, if the polyester resin to which the master batch is being added is PET, the thermoplastic polyester used in the carrier is preferably thermoplastic PET. Similarly, if the polyester resin into which the master batch is being added is PBT, the thermoplastic polyester used in the carrier is preferably thermoplastic PBT. The same is true for PEN and copolyesters of PET and PEN.

Preferably, the thermoplastic polyester in the carrier has a SIV of greater than about 0.800 dL/g. It is important to dry the thermoplastic polyester before it is processed into the master batch, but no further drying is necessary once the master batch has been formed. In other words, the master batch can be let down into the host polyester resin without the need for drying at the time of use.

The master batch according to the invention is preferably made by dry blending the three components comprising the carrier with the various additives comprising the additive package and then feeding the materials together into the feed throat of a twin screw extruder. The extruder screw design is not critical, and screw designs typically used for film-grade applications can be used. The thermoplastic polyester is pre-dried prior to extrusion, and preferably a vacuum is pulled at one of the vents. Preferably, the extruded material is pelletized or granulated. Small pellets or beads are preferred because they are easier to feed into and distribute within host polyester resins.

The present invention is also directed to a method of forming a polyester article. According to the method, a master batch as described above is let down into a polyester resin at the desired ratio. The master batch and polyester resin are thermally processed to form a melt. The melt is then processed to form a polyester article. Virtually any thermal processing method can be used, including injection molding, blow molding, sheet film extruding, and fiber drawing. The typical letdown ratio of master batch to polyester resin is within the range of from about 1500:1 to about 20:1 by weight. Typically, a greater amount of the master batch is letdown in an opaque application as compared to a transparent application.

EXAMPLES

The following examples are intended only to illustrate the invention and should not be construed as imposing limitations upon the claims.

Example 1

A master batch according to the invention was formed by blending 70.0 parts by weight of an additive package consisting solely of $TiO_2$ pigment with 30.0 parts by weight of a carrier consisting of the components listed in Table 1 below:

TABLE 1

| Carrier Component | Amount |
| --- | --- |
| pentaerythritol ester of partially hydrogenated wood rosin (Hercules FLORAL 105) | 20.0% (wt) |
| core-shell polymer (Rohm & Haas PARALOID EXL-8619) | 22.0% (wt) |
| thermoplastic PET (SIV = 0.950 dL/g) (Die Mossi & Ghisolfi-Gruppe TRAYTUF 9506) | 58.0% (wt) |

The additive package and components of the carrier were mixed together and fed into a twin screw extruder via a single feed stream. The PET was dried prior to introduction into the extruder. The extruded mixture was cooled using a water bath and then pelletized.

Comparative Example 2

A conventional liquid color master batch (not according to the invention) was formed by by blending 70.0 parts by weight of an additive package consisting solely of $TiO_2$ pigment with 30.0 parts by weight of a carrier consisting of the components listed in Table 2 below:

TABLE 2

| Carrier Component | Amount |
| --- | --- |
| mineral oil | 50.0% (wt) |
| ethoxylated sorbitan trioleate | 25.0% (wt) |
| sorbitan monooleate | 25.0% (wt) |

The additive package and components of the carrier were blended together until homogenous.

Example 3

The master batches formed in Examples 1 and 2 were each separately let down into a host PET resin (Die Mossi & Ghisolfi-Gruppe TRAYTUF 9506) at a ratio of 33.3:1 in a 90-ton Engle injection molding machine with a single cavity. The screw retraction time and measured SIV values for the two master batches are shown in Table 3 below:

TABLE 3

| Master batch | Screw Retraction Time | SIV (dL/g) |
| --- | --- | --- |
| None (100% host PET resin) | 7.1 seconds | 0.737* |
| Example 1 | 5.8 seconds | 0.705 |
| Example 2 | 11.0 seconds | 0.655 |

Note: The measured SIV value for the 100% PET resin (0.737 dL/g) is lower than the SIV value for the virgin PET resin (0.950 dL/g) due to the heat history introduced into the material during thermal processing.

Screw retraction time is an indication of screw slippage. A shorter screw retraction time indicates that the screw has good traction (i.e., little or no slippage). SIV correlates to molecular weight. A higher SIV value is generally preferred.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A master batch for a polyester resin comprising an additive package dispersed in a carrier, said carrier comprising an intimate blend of:
    from about 10 to about 25 percent by weight of one or more polyhydric alcohol esters of wood and/or gum rosin;
    from 5 to about 35 percent by weight of one or more core-shell polymers; and
    from about 25 to about 70 percent by weight of one or more thermoplastic polyesters compatible with said polyester resin.

2. The master batch according to claim 1 wherein said additive package comprises one or more selected from the group consisting of colorants, light stabilizers, heat stabilizers, flame retardants, antioxidants, lubricants, antistats, biocides, fillers, and process aids.

3. The master batch according to claim 1 wherein said additive package comprises at least about 5 percent by weight of said master batch.

4. The master batch according to claim 1 wherein said additive package comprises at least about 50 percent by weight of said master batch.

5. The master batch according to claim 1 wherein said polyhydric alcohol esters of wood and/or gum rosin comprise one or more selected from the group consisting of pentaerythritol esters of partially hydrogenated wood rosin, pentaerythritol esters of unhydrogenated wood rosin, pentaerythritol esters of fully hydrogenated wood rosin, glycerol esters of partially hydrogenated wood rosin, glycerol esters of unhydrogenated wood rosin, glycerol esters of fully hydrogenated wood rosin, triethylene glycol esters of partially hydrogenated wood rosin, triethylene glycol esters of unhydrogenated wood rosin, triethylene glycol esters of fully hydrogenated wood rosin, pentaerythritol esters of partially dimerized wood rosin, pentaerythritol esters of fully dimerized wood rosin, glycerol esters of partially dimerized wood rosin, glycerol esters of fully dimerized wood rosin, triethylene glycol esters of partially dimerized wood rosin, triethylene glycol esters of fully dimerized wood rosin, pentaerythritol esters of partially hydrogenated gum rosin, pentaerythritol esters of unhydrogenated gum rosin, pentaerythritol esters of fully hydrogenated gum rosin, glycerol esters of partially hydrogenated gum rosin, glycerol esters of unhydrogenated gum rosin, glycerol esters of fully hydrogenated gum rosin, triethylene glycol esters of partially hydrogenated gum rosin, triethylene glycol esters of unhydrogenated gum rosin, triethylene glycol esters of fully hydrogenated gum rosin, pentaerythritol esters of partially dimerized gum rosin, pentaerythritol esters of fully dimerized gum rosin, glycerol esters of partially dimerized gum rosin, glycerol esters of fully dimerized gum rosin, triethylene glycol esters of partially dimerized gum rosin, and triethylene glycol esters of fully dimerized gum rosin.

6. The master batch according to claim 1 wherein said core-shell polymer has a refractive index of from about 1.55 to about 1.60.

7. The master batch according to claim 1 wherein said core-shell polymer comprises a core comprising a copolymer of butadiene and styrene, an intermediate stage comprising polymers or copolymers of styrene, and a shell comprising a copolymer of styrene and an acrylate monomer.

8. The master batch according to claim 1 wherein said thermoplastic polyester has a SIV of greater than about 0.600 dL/g.

9. The master batch according to claim 1 wherein said polyester resin comprises one or more selected from the group consisting of PET, PEN, PBT, and copolyesters of PET and PEN.

10. The master batch according to claim 1 in the form of small pellets or beads.

11. A master batch for a polyester resin comprising an additive package dispersed in a carrier, said carrier comprising an intimate blend of:
 from about 10 to about 25 percent by weight of one or more pentaerythritol esters of wood rosin;
 from 5 to about 35 percent by weight of one or more core-shell polymers; and
 from about 25 to about 70 percent by weight of one or more thermoplastic polyesters compatible with said polyester resin.

12. The master batch according to claim 11 wherein said polyester resin comprises PET.

13. The master batch according to claim 12 wherein said carrier comprises:
 about 20 percent by weight of a pentaerythritol ester of partially hydrogenated wood rosin;
 about 22 percent by weight of a core-shell polymer comprising a core comprising a copolymer of butadiene and styrene, an intermediate stage comprising polymers or copolymers of styrene, and a shell comprising a copolymer of styrene and an acrylate monomer, said core-shell polymer having a refractive index of from about 1.55 to about 1.60; and
 about 58 percent by weight of thermoplastic PET having a SIV of at least 0.950 dL/g.

14. The master batch according to claim 13 wherein said additive package comprises a pigment comprising titanium dioxide.

15. A method of forming a polyester article, said method comprising letting down a master batch into a polyester resin without drying the master batch, heating said master batch and said polyester resin to form a melt, and processing said melt to form said polyester article, said master batch comprising an additive package dispersed in a carrier comprising an intimate blend of:
 from about 10 to about 25 percent by weight of one or more polyhydric alcohol esters of wood and/or gum rosin;
 from 5 to about 35 percent by weight of one or more core-shell polymers; and
 from about 25 to about 70 percent by weight of one or more thermoplastic polyesters compatible with said polyester resin.

16. The method according to claim 15 wherein the letdown ratio of said master batch to said polyester resin is within the range of from about 1500:1 to about 20:1 by weight.

17. The method according to claim 15 wherein said additive package comprises at least about 5 percent by weight of said master batch.

18. The method according to claim 15 wherein said polyester resin comprises PET.

19. The method according to claim 18 wherein said additive package comprises a pigment comprising titanium dioxide and said carrier comprises:
 about 20 percent by weight of a pentaerythritol ester of partially hydrogenated wood rosin;
 about 22 percent by weight of a core-shell polymer comprising a core comprising a copolymer of butadiene and styrene, an intermediate stage comprising polymers or copolymers of styrene, and a shell comprising a copolymer of styrene and an acrylate monomer, said core-shell polymer having a refractive index of from about 1.55 to about 1.60; and
 about 58 percent by weight of thermoplastic PET having a SIV of at least 0.950 dL/g.

20. The method according to claim 15 wherein said polyester article comprises an injection molded bottle or preform.

* * * * *